UNITED STATES PATENT OFFICE.

AUGUST LEOPOLD LASKA, OF OFFENBACH-ON-THE-MAIN, GERMANY, ASSIGNOR TO THE FIRM OF K. OEHLER, ANILIN & ANILINFARBEN FABRIK, OF OFFENBACH-ON-THE-MAIN, GERMANY.

VIOLET AZO DYE AND METHOD OF MAKING SAME.

SPECIFICATION forming part of Letters Patent No. 724,893, dated April 7, 1903.

Application filed November 11, 1902. Serial No. 130,870. (Specimens.)

*To all whom it may concern:*

Be it known that I, AUGUST LEOPOLD LASKA, doctor of philosophy, chemist, residing at 5 Gerberstrasse, Offenbach-on-the-Main, in the Grand Duchy of Hesse, Germany, have invented new and useful Improvements in Violet Azo Dyes, of which the following is a specification.

My invention is based on the discovery that by combining a tetrazotized paradiamin with two molecules of the glycin of an amidonaphthol sulfonic acid violet to blue coloring-matters are obtained, the constitution of which is represented by the following formula:

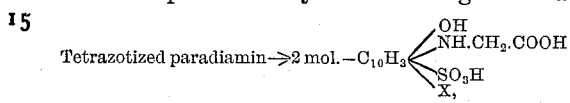

"X" meaning a hydrogen atom or a sulfo group. These coloring-matters dye on cotton violet to blue shades of very bright tints. As paradiamins there may be used benzidin, tolidin, dianisidin, and paraphenylenediamin, and as glycins those of the amidonaphthol sulfonic acids susceptible of combining with diazo compounds.

The following example may illustrate the manner in which my invention can be carried out and brought into practical effect.

9.2 parts of benzidin are dissolved in 28.6 parts of hydrochloric acid of 20° Baumé and two hundred parts of water, cooled with ice, tetrazotized with 6.9 parts of sodium nitrite. Then the whole is poured into an ice-cold solution of 34.1 parts of the glycin of the 2.5-amidonaphthol-7-sulfonic acid, care being taken that the mixture is kept alkaline throughout the combination process. For completing the formation of the dyestuff the mixture is stirred during twelve hours, heated up to 80° centigrade, precipitated with common salt, pressed, and dried. The dyestuff thus obtained forms a black-brown powder, being easily soluble in cold water and dyeing cotton in exceedingly bright violet shades.

If the benzidin in the above example is replaced by 10.2 parts of tolidin, a dyestuff of more bluish shades results.

Now what I claim, and desire to secure by Letters Patent, is the following:

1. The manufacture and production of disazo coloring-matters suitable for dyeing unmordanted cotton, consisting in the combination of a tetrazotized paradiamin with two molecules of the glycin of an amidonaphthol sulfonic acid of the general formula

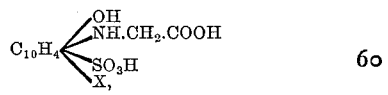

"X" meaning a hydrogen atom or sulfo group.

2. The manufacture and production of violet to blue disazo dyes, consisting in the combination of a paradiamin with two molecules of the glycin of the 2.5-amidonaphthol-7-sulfonic acid of the following formula:

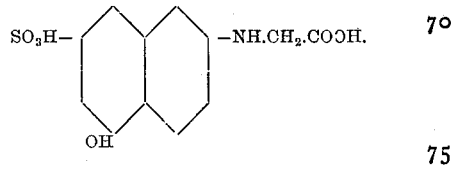

which dissolve in cold water to a violet to blue solution, and dye unmordanted cotton in violet to blue shades.

3. As a new article of manufacture the dyestuff of the constitution

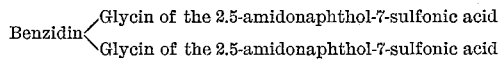

forming black-brown powder, easily dissolving in cold water to a violet solution, which becomes redder by the addition of concentrated sodium lye and separates a blackish violet precipitate on adding hydrochloric acid, dissolving in concentrated sulfuric acid with a pure blue color and dyeing unmordanted cotton a bright violet.

In testimony whereof I have signed my name to this specification in the presence of two subscribing witnesses.

AUGUST LEOPOLD LASKA.

Witnesses:
 OSKUR STUNDHARDT,
 EVA SATTLER.